United States Patent
Bui et al.

(10) Patent No.: US 7,423,531 B2
(45) Date of Patent: Sep. 9, 2008

(54) ELECTRONIC LABEL FOR THE IDENTIFICATION OF CONTAINERS, AND CONTAINER AND NOZZLE TOP COMPRISING ONE SUCH LABEL

(75) Inventors: Ngoc Chau Bui, Fontaines (CH); Alain Maillard, La Chaux de-Fonds (CH)

(73) Assignee: MBBS SA, Cortaillod (CH)

( * ) Notice: Subject to any disclaimer, the term of this patent is extended or adjusted under 35 U.S.C. 154(b) by 360 days.

(21) Appl. No.: 10/549,844

(22) PCT Filed: Aug. 7, 2003

(86) PCT No.: PCT/CH03/00536

§ 371 (c)(1),
(2), (4) Date: Sep. 19, 2005

(87) PCT Pub. No.: WO2004/084128

PCT Pub. Date: Sep. 30, 2004

(65) Prior Publication Data

US 2006/0187039 A1   Aug. 24, 2006

(30) Foreign Application Priority Data

Mar. 19, 2003   (CH) ..................... 0444/03

(51) Int. Cl.
*G06K 19/06* (2006.01)

(52) U.S. Cl. ............... 340/572.1; 340/578.8; 235/487; 235/494; 361/679

(58) Field of Classification Search ............ 340/572.1
See application file for complete search history.

(56) References Cited

U.S. PATENT DOCUMENTS

| 4,647,084 A * | 3/1987 | Hagin et al. ............. 285/332.1 |
| 6,024,142 A * | 2/2000 | Bates ......................... 141/94 |
| 2002/0185544 A1* | 12/2002 | Baillod et al. .............. 235/494 |
| 2003/0235027 A1* | 12/2003 | Smeyak et al. ............. 361/679 |

FOREIGN PATENT DOCUMENTS

| EP | 0 875 292 | 11/1998 |
| EP | 1 083 519 | 3/2001 |

OTHER PUBLICATIONS

Patent Abstracts of Japan, vol. 2000, No. 11, Jan. 3, 2001 & JP 2000 226032 A Maxell Seiki KK), Aug. 15, 2000 abrege.

* cited by examiner

*Primary Examiner*—Jeff Hofsass
*Assistant Examiner*—Ojiako Nwugo
(74) *Attorney, Agent, or Firm*—Young & Thompson

(57) ABSTRACT

An electronic label (1) is used to mark a container (2, 6). The label includes a radio identification element (RFID, Radio Frequency Identification Device) (10, 11) and which is intended to be placed inside the container (2, 6). The electronic label (1) is specifically adapted to the position thereof inside the container (2, 6). Using the present arrangement, the electronic label (1) is inaccessible and, thus, difficult to destroy or change. In this way, the container (2, 6) is marked in a reliable, even permanent, manner, thereby enabling the information contained on the label (1) to be used effectively to combat theft, forgery or counterfeiting and to manage a deposit system.

22 Claims, 5 Drawing Sheets

ELECTRONIC LABEL FOR THE IDENTIFICATION OF CONTAINERS, AND CONTAINER AND NOZZLE TOP COMPRISING ONE SUCH LABEL

This invention relates to an electronic label comprising an RFID (Radio Frequency Identification Device) for identification of containers, especially for identification of containers with, on their upper portion, an opening with a section that is smaller than the maximum section of the container. This invention likewise relates to such a container comprising an electronic label including an RFID as well as a dispenser top designed to be attached to such a container and comprising an electronic label including an RFID.

RFIDs are electronic circuits comprising a memory area in which data can be stored, and the contents of which can be remotely read and sometimes programmed by an inductive reading/writing device. They generally consist of at least one coil acting as an antenna, and an integrated circuit. The integrated circuit comprises a high-frequency circuit for demodulating or modulating the received or transmitted radio signals, and a microcontroller including a memory area that can contain data, generally an EEPROM (Electrically Erasable Programmable Read-Only Memory) or an OTP (One-Time Programmable) memory. An OTP memory is a memory in which the data can be written only once, but from which they can be read several times. OTP memories are sometimes likewise called WORM (Write Once, Read Multiple) memories. RFIDs are generally passive circuits, i.e., they do not have their own power source. They recover the power necessary for their operation on the signal transmitted by the inductive reading/writing device.

Electronic labels are used mainly to identify the product with which they are combined and for this reason they can contain various data, such as, for example, a description of a product, its origin, its production date, its sales price, etc. These data can be used by the manufacturer and/or by various members of the distribution chain for example to facilitate inventory management, to allow the product to be traced, or to check its authenticity. At the points of sale, for example, electronic labels can likewise be used to protect against theft.

In order to prevent tampering or in certain cases to allow identification of counterfeits, the data contained in the electronic label can comprise, for example, an electronic signature specific to the manufacturer or can be at least partially encoded according to a code known only from the manufacturer. Products that have been tampered with or counterfeits that would have a marker, but of which no information would be encoded, could thus be identified.

Thus, electronic labels must preferably be attached in an integral manner to the products that they identify, in order to prevent substitution of one electronic label by another, or the destruction of the label. The RFID, especially its antenna, must likewise be mechanically protected in order to prevent any damage, for example during shipping of the product, which can afterwards prevent its proper operation.

Electronic labels of the prior art are implemented in various forms: cards, stickers, plastic disks, glass capsules, etc. These labels of the prior art, however, are not suitable for reliable labeling of all products. For example, they are not suitable for labeling certain containers such as bottles or barrels, for example, nor for labeling products that are often liquid and contained in these containers. Thus, reliable labeling of the barrels or bottles would allow better traceability of these containers and/or of the products that they contain.

In the case of cosmetic products, for example, especially for perfumes and toilet waters, reliable labeling of the bottles and flasks would be an effective means of controlling tampering, counterfeits, the gray market, or theft. Since electronic labels of the prior art are not suited to being attached to a bottle, they are often glued to the box in which the bottle is sold, or else they are slipped into the box at the points of sale and are essentially used only to prevent theft. This system has the major disadvantage of offering only limited protection against tampering or against theft, since the box can be easily emptied, substituted or destroyed. The electronic labels are sometimes likewise glued or attached to the outside of the bottle or in its cap. These latter implementations, however, have the same problem of reliability as the above-described system and, moreover, often engender additional aesthetic problems.

In the case of certain products contained in specific, reusable containers, reliable labeling of the container would allow, moreover, better management of return systems, for example. Such labeling would be desirable, for example, in the case of certain drinks, for example for beer under pressure, which is generally contained in metal barrels with a capacity of several tens of liters. The efficiency of the labeling systems of the prior art is often limited, because the labels used are often damaged during transport of the barrels.

One object of this invention is thus to propose a means for labeling containers that are provided with an opening with a section that is smaller than the maximum section of the container, allowing reliable identification of these containers and/or their contents.

Another object of this invention is to propose a means of labeling containers allowing effective control of theft, tampering and counterfeits.

Another object of this invention is to propose a means of labeling the containers allowing the management of return systems to be made easier and more reliable.

These objects are achieved using an electronic label, a container and/or a dispenser top comprising the characteristics of the corresponding independent claims, advantageous variants being described by the dependent claims.

In particular, these objects are achieved by an electronic label for labeling a container comprising a radio identification element (RFID, Radio Frequency Identification Device), designed to be placed within the container. According to the invention, the electronic label is specifically suited to its being positioned within the container, this arrangement enjoying the advantage of making the electronic label inaccessible and thus difficult to destroy or substitute. The container is thus labeled in a reliable manner, or even permanent manner, for example allowing use of the data contained in the electronic label for effectively controlling theft, tampering or counterfeits, or for allowing management of a return system.

This invention will be better understood using the description of its preferred versions given by way of explanatory, but not limiting examples, and illustrated by FIGS. 1 to 9.

Figure 1:
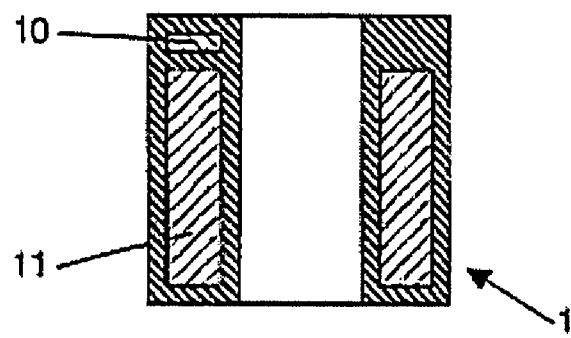
FIG. 1 is a sectional drawing of an electronic label according to the invention.
Figure 2:
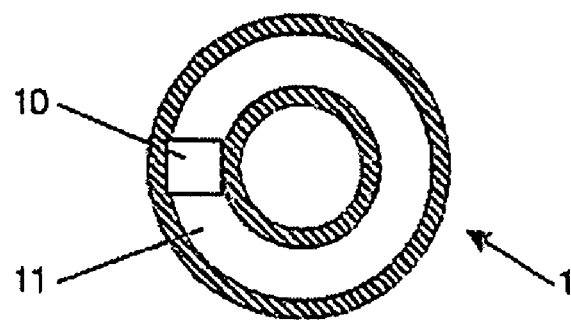
FIG. 2 is a top view of an electronic label according to the invention.

According to the preferred version of the invention, the electronic label 1 shown in FIGS. 1 and 2 consists of an RFID (Radio Frequency Identification Device) comprising an integrated circuit 10 and an antenna 11.

The integrated circuit 10 includes a high-frequency circuit for demodulating or modulating the received or transmitted radio signals, and a microcontroller with a memory area that can contain data, preferably a read/write EEPROM (Electrically Erasable Programmable Read-Only Memory) memory or an OTP (One-Time Programmable) memory. OTP memories are likewise called WORM (Write Once Read Multiple) memories. The latter are advantageously used in RFID elements designed to permanently label products, because the cost is less than that of an EEPROM of equivalent capacity. Conversely, they are generally not suited to labeling reusable containers, the application for which EEPROM are preferred.

OTP memories are generally organized in several portions such that each portion can be programmed independently and at different times in the process of production and distribution. Thus, a first portion can be programmed, for example, by the distributor who advantageously loads the data specific to the contents of the bottle: nature of the product, origin, date of manufacture or bottling date, etc. A second portion can be programmed by, for example, the wholesaler or the importer who can load information on the destination of the product as well as data allowing him better inventory management, for example. Another portion can then be programmed at the final point of sale where, for example, the price of the product can be loaded. Of course, other divisions and types of information are conceivable. One skilled in the art, however, will understand that such segmentation of information can, of course, likewise be implemented with an EEPROM.

The antenna 11 is preferably formed by a cylindrical coil, for example made of insulated copper wire.

The components of the electronic label 1 are preferably molded from a plastic material or resin in order to impart to the label the desired shape and to guarantee it a certain behavior and rigidity. One skilled in the art, however, will understand that it is likewise possible to make an electronic label according to the invention by housing its components in a preferably watertight box, for example a plastic or metal box, with the desired shape. In its preferred version, the electronic label 1 in its center has a hole that is, for example, cylindrical, in the manner of a socket, around which the antenna 11 is arranged. The external shape of the label is likewise preferably cylindrical. The label can thus be easily housed in the opening of a container, for example in the neck of a bottle or in the valve of a barrel, while allowing passage of the product contained in the bottle.

Figure 3:
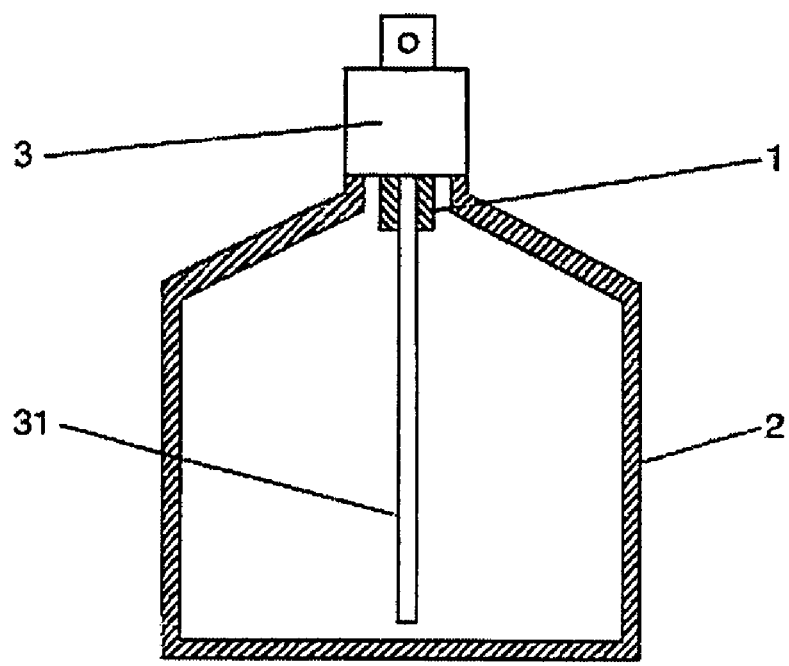
FIG. 3 is a partial sectional drawing of a bottle provided with an electronic label according to one variant of the invention.

FIG. 3 illustrates a bottle 2 provided with an electronic label 1 according to the preferred version of the invention. The bottle 2 is closed, preferably sealed, by a dispenser top, for example an atomizer 3 such as is presently used for bottles of perfume or toilet water. The electronic label 1 is located within the bottle 2. It is thus rendered inaccessible and accordingly can only be substituted or destroyed with difficulty. To prevent its moving freely in the bottle 2, which would risk, among other things, its damage or generation of unpleasant rattling, the electronic label 1 is preferably attached around the stem 31 of the dispenser top, for example of the atomizer 3. The atomizer 3 is preferably fixed on the bottle 2, therefore the electronic label 1 comprises an integral portion of the bottle 2 and cannot be separated from it without unsealing the bottle.

Since the electronic label 1 according to the preferred version of the invention preferably has the shape of a socket, it can be advantageously housed in the neck of the bottle 2, around the stem 31 of the atomizer 3, while allowing the contents of the bottle 2 that are not shown to pass through its center to exit the bottle 2.

The reading and/or writing of the information in the electronic label 1 is done without contact using an inductive reading/writing device. The modulation frequency used for this purpose is preferably low, for example roughly 125 kHz, in order to facilitate reading and/or writing when the electronic label 1 is located in the product, for example a liquid product, contained in a bottle 2 or under a metallic dispenser top 3.

The dimensions of the electronic label 1, generally roughly several millimeters, are minimized, for example, relative to the diameter of the stem 31 of the atomizer 3, in order to make it difficult to attempt to destroy it by electromagnetic coupling.

According to the invention, there are several versions of attaching the electronic label 1 within the bottle 2.

Figure 4:
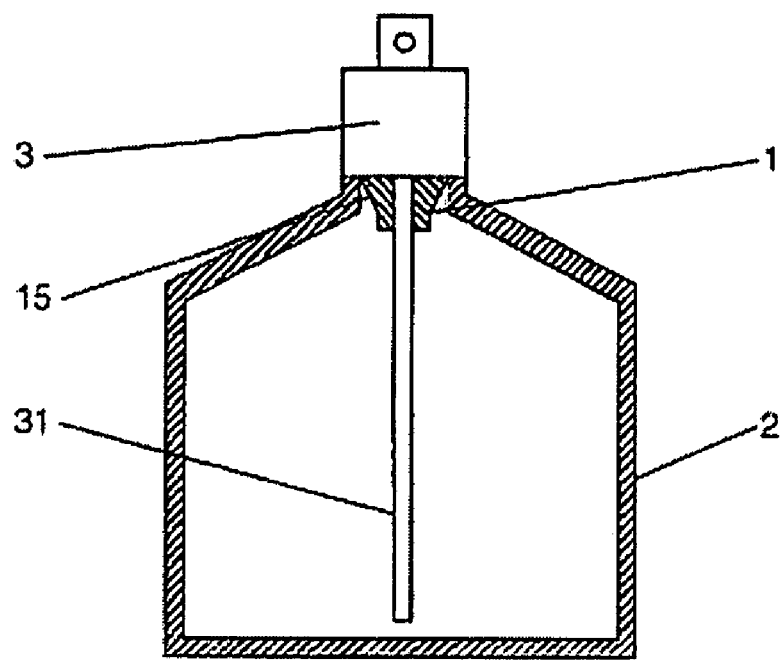
FIG. 4 is a partial sectional drawing of a bottle provided with an electronic label according to another variant of the invention.

In one variant illustrated in FIG. 4, the electronic label 1 is kept in the neck of the bottle by fins 15 arranged on the circumference of one of its ends and adapted to the inside diameter of the neck of the bottle 2 to be labeled. When it is installed, the electronic label 1 is inserted into the neck of the bottle 2, thus slightly deforming the fins 15 that have an outside diameter that is slightly greater than the inside diameter of the neck of the bottle 2. The fins 15 thus keep the electronic label 1 in place by pressure against the internal walls of the neck of the bottle 2. This mechanism prevents the electronic label 1 from exiting the bottle 2 and/or falling to the bottom when the dispenser top 3 is removed, for example during production, when the bottle 2 is being filled, if the electronic label 1 is inserted into the bottle 2 before the product.

Figure 5:
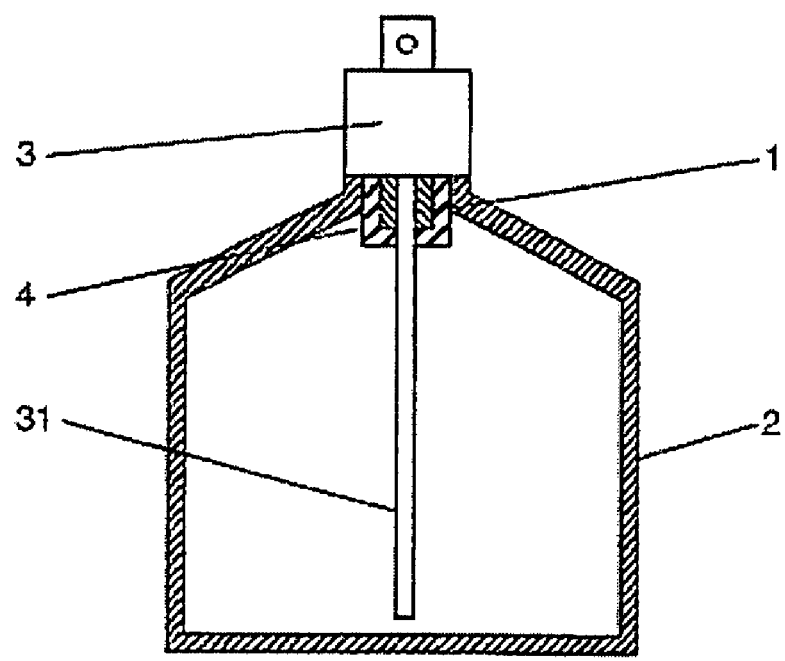
FIG. 5 is a partial sectional drawing of a bottle provided with an electronic label according to another variant of the invention.

In another variant, the electronic label 1 and the body of the dispenser top 3 are combined in a capsule 4, preferably watertight, likewise called a "sock". This sock 4, the lower portion of which is shown in a sectional diagram in FIG. 5, can be formed from, for example, two plastic components that can be fitted together and kept inside one another, watertightness being ensured by, for example, a seal that is not shown. The sock 4 thus keeps the electronic label 1 and the body of the dispenser top 3 firmly against one another. This variant, moreover, offers the advantage that the plastic or resin from which the electronic label 1 is molded does not come into contact with the product contained in the bottle 2.

Figure 6:
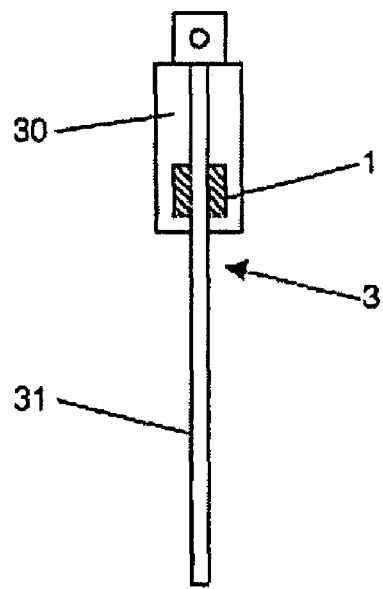
FIG. 6 shows a variant of an atomizer provided with an electronic label according to the invention.

In still another variant illustrated in FIG. 6, the electronic label 1 is molded directly into the body 30 of the dispenser top 3. This variant has the advantage of avoiding any additional coating of the electronic label 1, while preventing its contact with the product that will be contained in the bottle.

Figure 7:
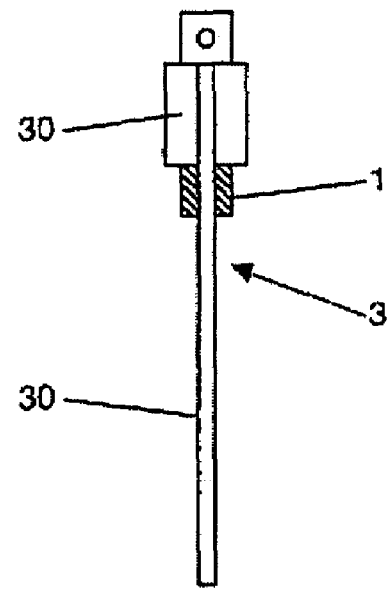
FIG. 7 shows another variant of an atomizer provided with an electronic label according to the invention.

In a variant illustrated in FIG. 7, the electronic label 1 is simply integrally connected, for example soldered or glued, to the body 30 of the dispenser top 3. This variant makes it possible to use standard dispenser tops 3 without the need to modify them. According to this version, however, it is preferable, in order to ensure the best possible adhesion and to prevent any additional risk of deterioration of the product that will be contained in the bottle, to use the same plastic or resin as that used for producing the body 30 of the dispenser top 3 to coat the electronic label 1.

One skilled in the art will understand that the aforementioned variants are given by way of example and that other means of attachment of the electronic label 1 in the bottle 2 are possible.

In the above-described examples, the container labeled by the electronic label 1 is a bottle 2, and the dispenser top 3 is an atomizer. Other types of containers and/or dispenser tops are conceivable, however, within the framework of the invention. The container can be provided with, for example, an applicator top, a push-button top such as is used at present for liquid soap, a metering top, a valve, etc.

Figure 8:
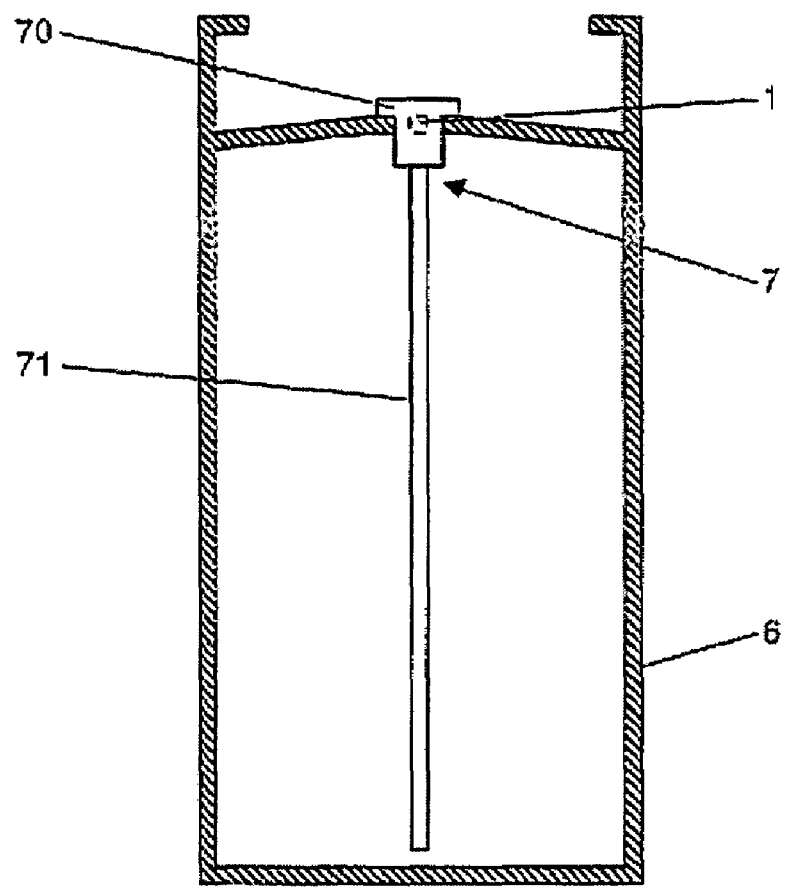
FIG. 8 is a partial sectional drawing of a barrel provided with an electronic label according to another variant of the invention.

FIG. 8 illustrates, for example, a barrel 6 in a partial sectional drawing, for example a barrel such as is used for beer under pressure, labeled by an electronic label 1 according to the invention. These barrels, often metallic, are reusable containers. They are generally the object of monitoring that makes it possible, for example, to manage a return system, to monitor delivery networks, to record and periodically bill delivered amounts of drink, etc. The barrel 6 comprises, on its upper portion, an opening with a section smaller than the maximum section of the barrel 6. This opening is plugged, generally permanently, by a dispenser top 7 with a body 70 that is often made of metal and that is adapted to the device, for example a pressurized beer dispenser to which the barrel 6 will be connected. The dispenser top 7 comprises a tube 71 in which the drink rises under pressure when the top 7 is open.

Figure 9:
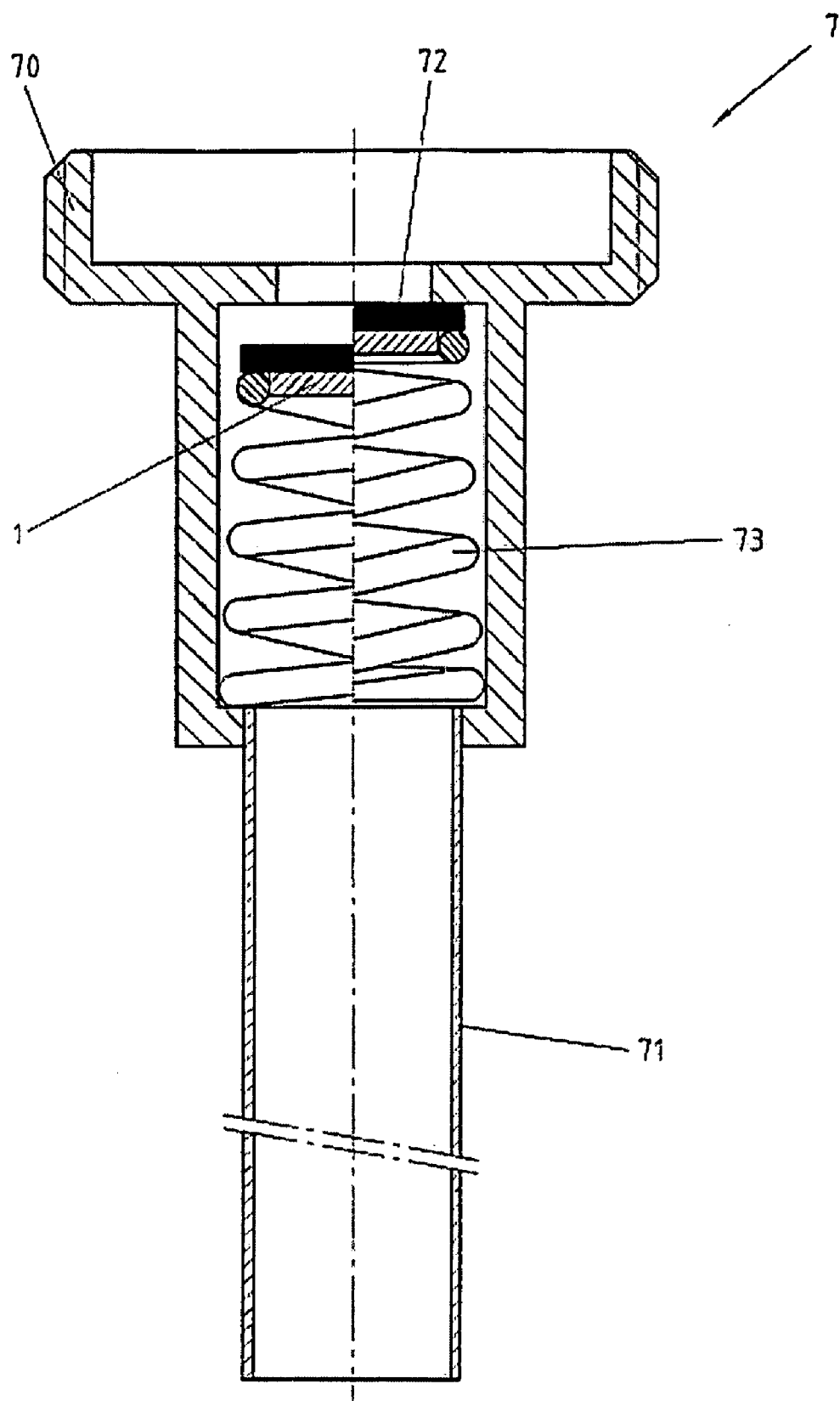
FIG. 9 is a partial sectional drawing of a dispenser top of a barrel provided with an electronic label according to another variant of the invention.

FIG. 9 is a schematic sectional drawing of such a dispenser top 7. The body 70 of the top 7 is preferably cylindrical and comprises at its center an opening that is closed by a valve 72. The valve 72 illustrated in the open position on the left half of FIG. 9 and in the closed position on the right half makes it possible to control the passage of the drink, for example beer, through the dispenser top 7. It is pushed back into its closed position by a spring 73.

According to the invention, an electronic label 1 is attached to or integrated into the body 70 of the dispenser top 7 in order to reliably label the barrel 6. As illustrated using the preceding examples, there can be several ways to attach the electronic label 1. In the case of a dispenser top 7 designed, for example, to close a keg 6, the electronic label 1 is, however, advantageously attached, for example glued or screwed, directly under the valve 72, in the center of the spring 73. It is thus placed in the center of the barrel 6 and near the upper surface of the dispenser top 7. The reading of the data contained in the electronic label 1 can thus be easily done using an inductive reading/writing device placed above the center of the barrel 6; this is especially practical when the barrels are stored vertically beside one another. As explained above, the frequency of modulation used is preferably low, for example roughly 125 kHz, in order to allow reading/writing of these data in spite of the completely metallic environment of the electronic label 1. According to the configuration illustrated in FIG. 9, the drink flowing into and out of the barrel 6 passes around the electronic label 1 that is then not necessarily open in its center. To prevent any degradation of the drink by contact, the electronic label 1 is integrated, for example, into a watertight, stainless steel box.

Figure 10:
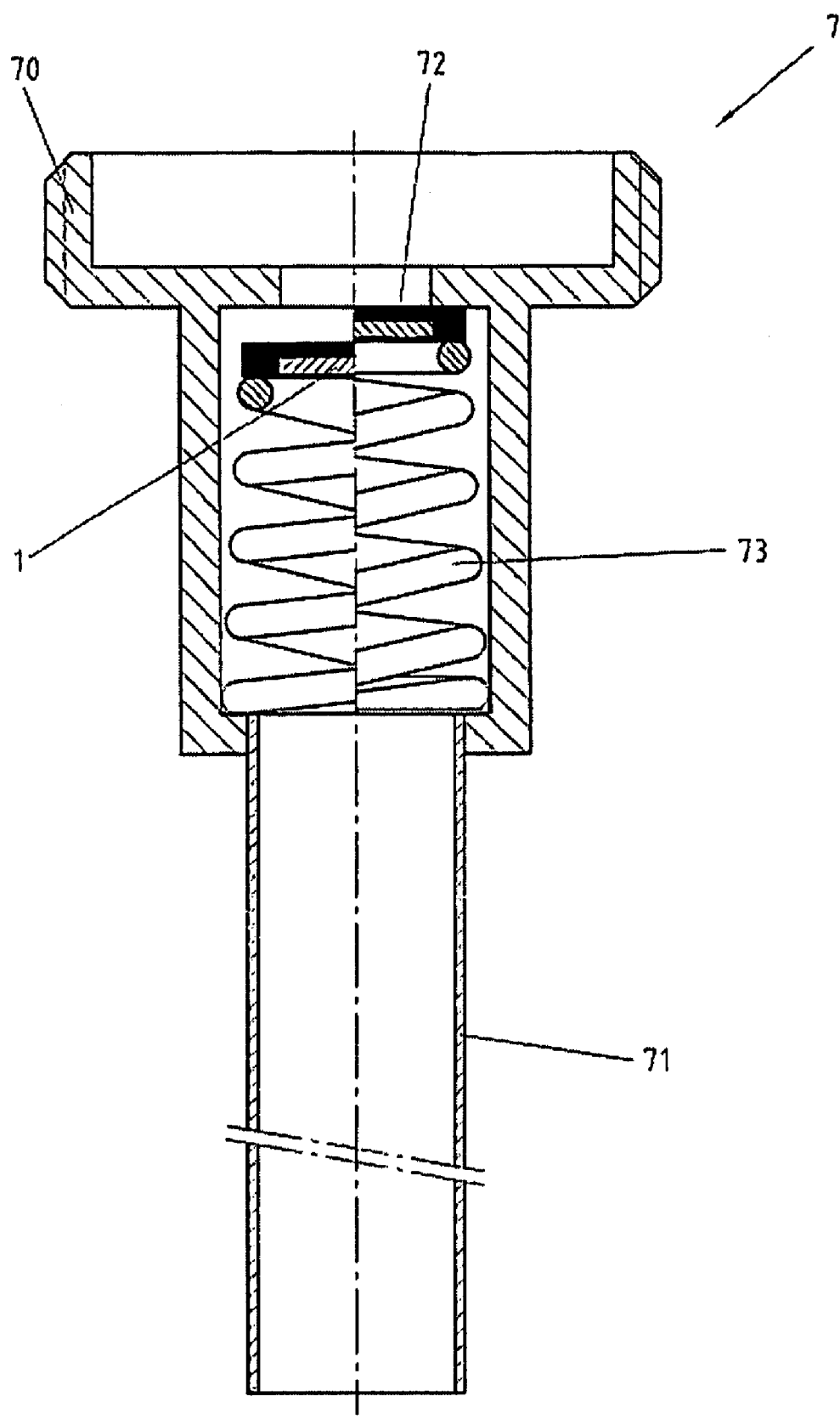
FIG. 10 is a partial sectional drawing of a dispenser top of a barrel provided with an electronic label according to still another variant of the invention.

According to a variant illustrated in FIG. 10, the electronic label 1 is integrated into the valve 72. The electronic label 1 is inserted, for example, into a housing formed on one of the surfaces of the valve 72, for example by molding during production of the latter or by later milling. The housing that contains the electronic label 1 is preferably closed in a watertight manner in order to prevent any contact between the electronic label 1 and the contents of the barrel 6. In the case of a metallic valve 72, for example, the housing is preferably closed using a likewise metallic plate that is attached, for example soldered or glued, to the valve 72 over the entire periphery of the opening. One skilled in the art will understand, however, that the housing in which the electronic label 1 is located can be closed by other means, depending on, for example, the material used for the production of the valve 72 and the dimensions of the opening. One skilled in the art will understand that it is likewise conceivable to directly integrate the electronic label 1 during production of the valve 72, for example by molding the valve 72 around the electronic label 1.

The integration of the electronic label 1 into the valve 72 allows good mechanical protection of the electronic label 1, in particular against any contact with the liquid contained in the barrel 6. This likewise makes it possible to avoid any risk that the electronic label 1 will detach from the valve 72 to end up, for example, at the bottom of the barrel 6, where reading and/or writing of information it contains would be difficult, or even impossible.

In its preferred version, the invention is especially suited to labeling bottles of perfume or other cosmetic products. On the one hand, since these products are generally contained in bottles or flasks of small volume, to be used one time, it is important that the price of the electronic label constitute only a relatively small portion of the sales price of the bottle and its contents. As it happens, the cost of production of an electronic label according to the invention, especially if it is provided with an OTP memory, can be kept relatively low. On the other hand, since the sales price of the product is rather high, it is justified to reliably label each bottle in order to be able to effectively control tampering, theft or counterfeits.

The aesthetic aspect of bottles used for cosmetic products, moreover, takes on particular importance. This is why the electronic label must be as inconspicuous as possible. Placement of the electronic label within the bottle is thus particularly well suited. Since bottles are generally watertight, or even sealed due to the volatility of products, an electronic label placed within the bottle cannot be removed without causing damage to the bottle that is generally visible, thus preventing any sale of the adulterated product.

Cosmetic products as well as food products are relatively sensitive to materials with which they come into contact, especially to the odors that these substances could release. It is thus preferable to use plastics or resins that are as neutral as possible for molding the electronic label according to the invention. The product contained in the labeled container can likewise be protected against possible deterioration due to the electronic label by integration of the latter in a sock, in a watertight case, for example metallic, or directly in the body of the dispenser top.

According to the above-described variants of the invention, the container 2 or 6 is sealed by a fixed dispenser top 3, 7. One skilled in the art will understand, however, that it is likewise possible within the framework of the invention to use a detachable, for example screw-on, dispenser top. The use of this type of top, however, has the disadvantage of not guaranteeing the same security against destruction or substitution of the electronic label 1, especially after the sale of the container and/or its content to the final customer.

One skilled in the art will also understand that the electronic label according to the invention can likewise be used for labeling containers provided with tops that are not used for dispensing purposes. In this case, however, the labeling of the container is generally no longer ensured after the sale of the container and/or its contents to the final customer.

The invention claimed is:

1. Electronic label (1) comprising a radio identification element (RFID, Radio Frequency Identification Device) (10, 11) for labeling a container (2, 6), the radio identification element having a cylindrical shape that allows the radio identification element to be attached on a dispenser (3, 7) and within the container (2, 6) to be labeled.

2. Electronic label (1) according to claim 1, wherein, the radio identification element is shaped to be attached on said dispenser (3, 7) and in the opening of said container (2, 6).

3. Electronic label (1) according to claim 2, the cylindrical shape allowing the radio identification element to be attached on said dispenser (3, 7) and in the neck of a bottle (2).

4. Electronic label (1) according to claim 1, the cylindrical shape allowing the radio identification element to be attached on said dispenser (3, 7) and having an opening that allows passage of the contents of said container (2, 6).

5. Electronic label (1) according to claim 1, the cylindrical shape allowing the radio identification element to be attached on said dispenser (3, 7) and to be combined in a watertight capsule (4).

6. Electronic label (1) according to claim 1, said radio identification element is attached on said dispenser (3, 7) and comprising an electronic circuit (10) and an antenna (11), said antenna (11) consisting of a cylindrical coil.

7. Electronic label (1) according to claim 6, the radio identification element is attached on said dispenser (3, 7) and the contents of said container (2, 6) being able to pass in the center of said coil (11).

8. Container (2, 6) in combination with a dispenser comprising an opening, a section of said opening being smaller than a maximum section of said container (2, 6) and comprising an electronic label (1) containing a radio identification element (RFID, Radio Frequency Identification Device) (10, 11), wherein said electronic label (1) is located on said dispenser within said container (2, 6).

9. Container (2, 6) and dispenser according to claim 8, said electronic label (1) being placed on said dispenser in said opening.

10. Container (2, 6) and dispenser according to claim 8, closed by a top (3, 7), said electronic label (1) being placed on said dispenser under or in said top (3, 7).

11. Container (2, 6) and dispenser according to claim 10, said top being a dispenser top (3), said electronic label (1) being placed around the stem (31) of said dispenser top (3).

12. Container (2, 6) and dispenser according to claim 10, said electronic label (1) and the body (30) of said dispenser top (3) being combined in a watertight capsule (4).

13. Container (2, 6) and dispenser according to claim 10, said electronic label (1) being molded in the body (30, 70) of said dispenser top (3, 7).

14. Container (2, 6) and dispenser according to claim 9, said electronic label (1) comprising fins (15), said fins preventing the electronic label (1) from exiting the container (2, 6) when the dispenser top (33) is removed.

15. Container (2, 6) and dispenser according to claim 9, said dispenser top (7) comprising a valve, and said electronic label (1) being placed in the valve.

16. Dispenser top (3, 7) for closing the opening of a container (2, 6), the section of said opening being smaller than the maximum section of said container (2, 6) wherein the dispenser top comprises an electronic label (1) containing a radio identification element (RFID, Radio Frequency Identification Device) (10, 11), the transponder mounted on the dispenser top.

17. Dispenser top (3, 7) according to claim 16, said electronic label (1) being placed around the stem of said dispenser top (3, 7).

18. Dispenser top (3, 7) according to claim 16, said electronic label (1) being integrally connected to the body (30, 70) of the dispenser top (3).

19. Dispenser top (3, 7) according to claim 16, said electronic label (1) being molded in the body (30, 70) of said dispenser top (3, 7).

20. Dispenser top according to claim 16, comprising a valve, said electronic label (1) being placed in the valve.

21. Electronic label (1) according to claim 1, wherein, the radio identification element is modulated at 125 kHz, and is operative within a liquid.

22. Electronic label (1) according to claim 1, wherein, the radio identification element is operative within a liquid.

* * * * *